United States Patent [19]

Depew et al.

[11] 4,387,636
[45] Jun. 14, 1983

[54] APPARATUS FOR CRUSHING AND REMOVING RIMS FROM WHEELS

[75] Inventors: Dean A. Depew; Harold K. Murphy, 4729 Arlington Ave., both of Fort Wayne, Ind.

[73] Assignee: Harold K. Murphy, Fort Wayne, Ind.

[21] Appl. No.: 266,793

[22] Filed: May 22, 1981

[51] Int. Cl.³ .............................................. B30B 7/04
[52] U.S. Cl. .................................. 100/232; 29/403.3; 100/91; 100/233; 100/295; 100/901; 269/305
[58] Field of Search .................. 100/91, 232, 233, 901, 100/295; 29/403.3, 427; 157/1.21; 269/303, 305

[56] References Cited

U.S. PATENT DOCUMENTS

| | | | |
|---|---|---|---|
| 4,080,887 | 3/1978 | Larsen | 100/232 |
| 4,083,394 | 4/1978 | Heikkinen | 100/232 X |
| 4,188,876 | 2/1980 | Graves | 100/232 |

Primary Examiner—Billy J. Wilhite
Attorney, Agent, or Firm—David A. Lundy

[57] ABSTRACT

An apparatus for crushing and removing rims from wheels. The apparatus comprises a generally horizontally disposed bed plate for placement within a scrap metal compactor having two oppositely disposed and hinged crushing pads, a carriage having a crushing surface securely mounted upon the bed plate for supporting a wheel comprised of a tire and rim, a wheel receptacle and wheel supports securely fixed on the carriage, two crushing pad points securely mounted on the crushing pads of the metal compactor, and means for moving the crushing pad points downward and into the wheel and rim thereby crushing the rim between the crushing pad points and the crushing surface and facilitating the removal of said rim from said wheel.

11 Claims, 6 Drawing Figures

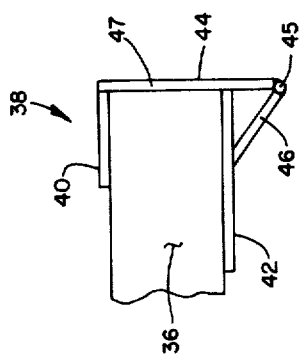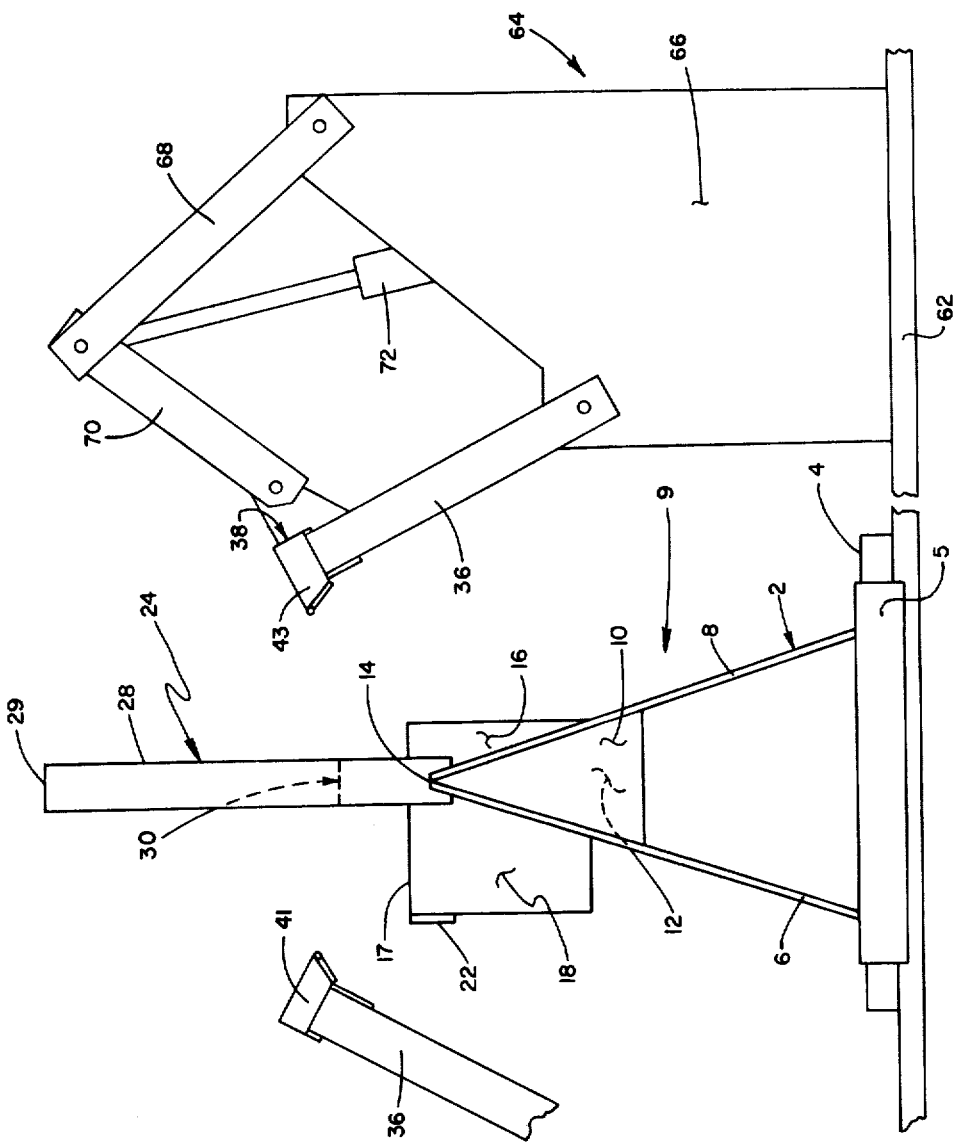

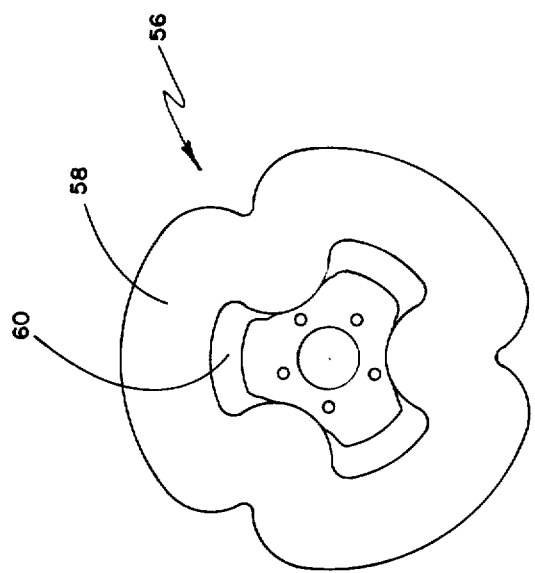
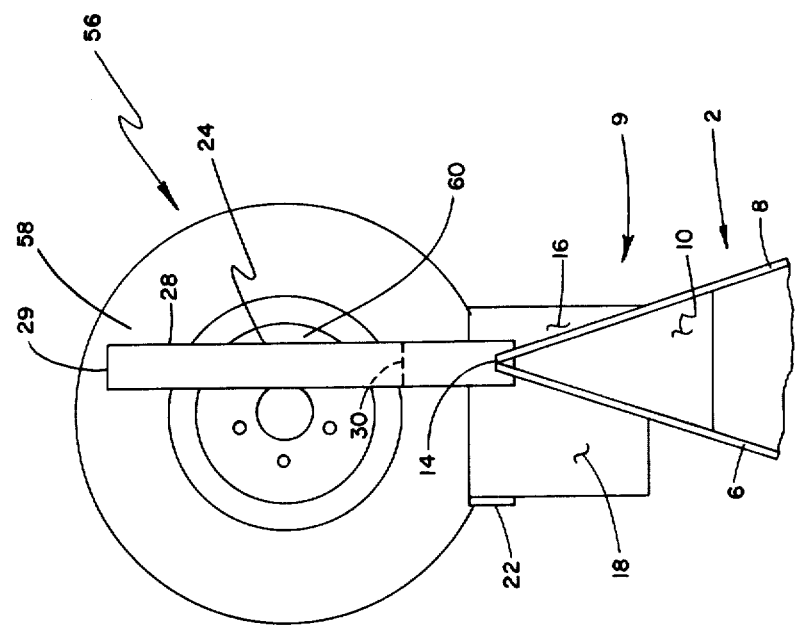

APPARATUS FOR CRUSHING AND REMOVING RIMS FROM WHEELS

BACKGROUND OF THE INVENTION

This invention pertains to a wheel rim crusher, and more particularly to a wheel rim crusher integrable to any scrap metal compactor having two oppositely disposed, hinged crushing pads. See for example U.S. Pat. No. 4,188,876 issued to Donald J. Graves on Feb. 19, 1980.

In the recycling industry, prior to compacting cars into relatively flat bodies for removal from auto salvage establishments, the wheels must be removed and the tires discarded from the rims. Generally, the rims are thereafter placed in the auto for crushing with the auto. The procedure to remove the tire from the rim has been a persistent and expensive problem. An excessive amount of time is wasted due to the difficulty in removing the tire from the rim resulting in costly expenses in terms of man hours expended and backlogging of autos to be crushed.

Additionally, costs are further increased by the expense of machinery and hand tools necessary in the removal of rims from wheels and the crushing of the rims.

Prior art rim crushers are generally heavy, bulky and generally relatively expensive machines of relatively complex structure.

It is therefore highly desirable to provide an improved wheel rim crusher.

It is therefore highly desirable to provide an improved wheel rim crusher for use with a scrap metal compactor having two oppositely disposed, hinged crushing pads.

It is also highly desirable to provide an improved wheel rim crusher that eliminates the waste in money and time spent in removing rims from wheels.

It is further highly desirable to provide an improved wheel rim crusher that is less expensive than present wheel rim crushers.

It is still further highly desirable to provide an improved wheel rim crusher that is simple in construction, simple to operate and simple to maintain.

It is again still further highly desirable to provide an improved wheel rim crusher that is light in weight, yet durable, and easily transportable and maneuverable.

It would finally be highly desirable to provide an improved wheel rim crusher which meets all of the above desired features.

SUMMARY OF THE INVENTION

A primary object of the invention is to provide an improved wheel rim crusher.

It is another object of the invention to provide an improved wheel rim crusher for use with a scrap metal compactor having two oppositely disposed hinged crushing pads.

It is another object of the invention to provide an improved wheel rim crusher that eliminates the waste in money and time spent in removing rims from wheels.

It is another object of the invention to provide an improved wheel rim crusher that is less expensive than present wheel rim crushers.

It is another object of the invention to provide an improved wheel rim crusher that is simple in construction, simple to operate and simple to maintain.

It is a further object of the invention to provide an improved wheel rim crusher that is light in weight, yet durable, and easily transportable and maneuverable.

In the broader aspects of this invention there is provided an apparatus for crushing and removing rims from wheels. The apparatus comprises a generally horizontally disposed bed plate for placement within a scrap metal compactor having two oppositely disposed and hinged crushing pads, a carriage having a crushing surface securely mounted upon the bed plate for supporting a wheel comprised of a tire and rim, a wheel receptacle and wheel supports securely fixed on the carriage, two crushing pad points securely mounted on the crushing pads of the metal compactor, and means for moving the crushing pad points downward and into the wheel and rim thereby crushing the rim between the crushing pad points and the crushing surface and facilitating the removal of said rim from said wheel.

BRIEF DESCRIPTION OF THE DRAWINGS

The above-mentioned and other features and objects of this invention and the manner of attaining them will become more apparent and the invention itself will be best understood by reference to the following description of a preferred embodiment of the invention taken in conjunction with the accompanying drawings, wherein:

FIG. 1 is a front view of the invention;

FIG. 2 is a fragmentary side view of a crushing pad point with the sides removed mounted on a crushing pad of a metal compactor;

FIG. 5 is a fragmentary axial view of a wheel mounted on the carriage shown in FIG. 3; and FIG. 6 is an axial view of a wheel crushed by the invention.

DESCRIPTION OF A PREFERRED EMBODIMENT

Figure 4:
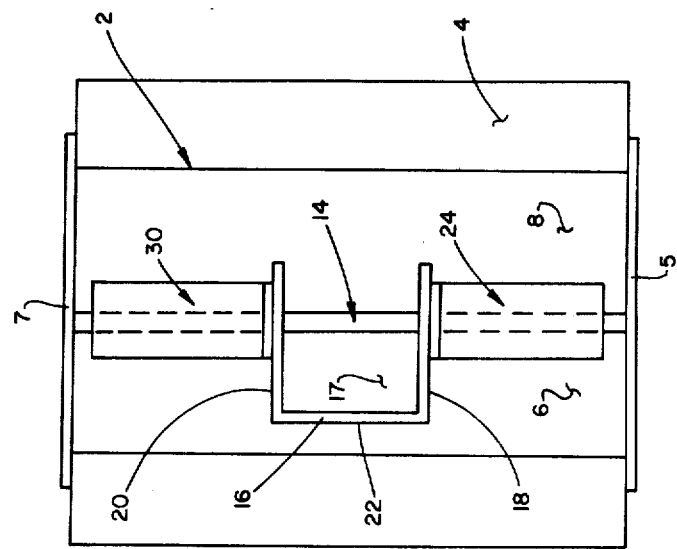
FIG. 4 is a top view of the invention without the crushing pad points.

Referring to FIGS. 1 through 6, an A-frame carriage 2 is shown having a left frame 6, a right frame 8, a bed plate 4 with front and rear lips 5, 7, a front flange 10 and a rear flange 12. The front and rear flanges 10, 12 and left and right frames 6, 8 define apex 14.

Securely attached to A-frame carriage 2 is a wheel receptacle 16 comprising a front wall 18, a rear wall 20, and a left wall 22. Left wall 22 has a vertical dimension less than rear and front walls 18, 20 and is attached thereto with the upwardly facing edges of vanes 18, 20 and 22 flush. An opening 27 is defined by front wall 18, rear wall 20, left wall 22, and left frame 6 of A-frame carriage 2 into which a portion of wheel 56 comprised of tire 58 and rim 60 is positioned both before and after the crushing process. See FIGS. 5 and 6. The position of wheel receptacle 16 upon A-frame carriage 2 is such that wheel receptacle 16 is centrally fixed upon and slightly to one side of apex 14. An exposed portion of apex 14 of A-frame carriage 2 extends between front wall 18 and rear wall 20 as depicted in FIG. 4 thereby defining an upstanding crushing surface.

Figure 3:
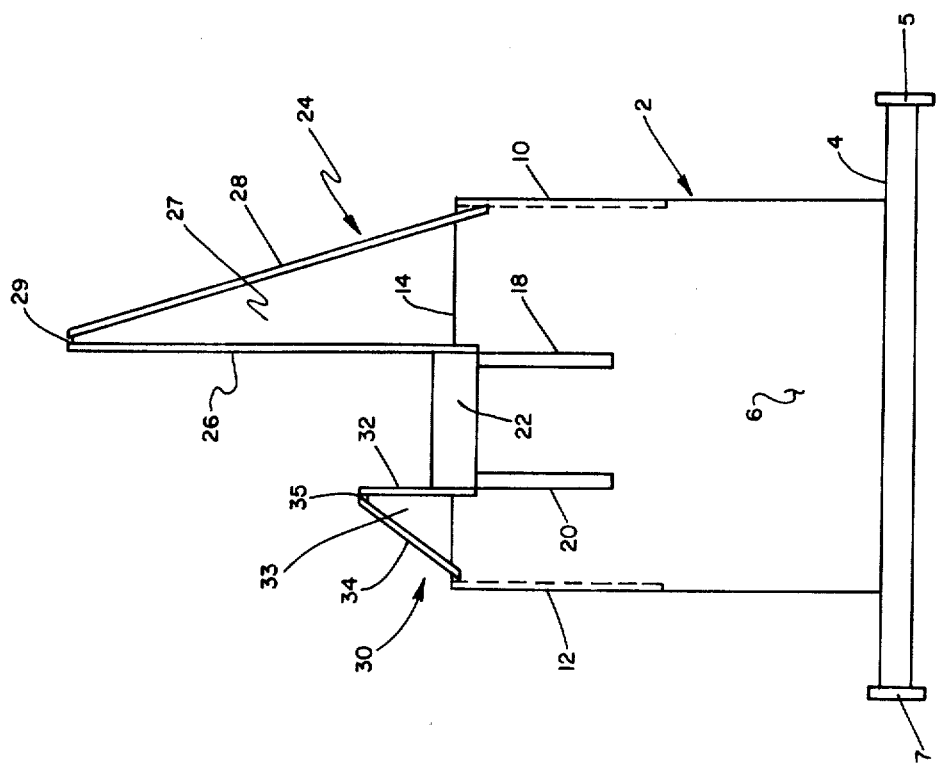
FIG. 3 is a side view of the invention without the crushing pad points.

Referring now to FIG. 3, first and rear wheel supports 24 and 30, respectively, are shown. Front wheel support 24 has a generally vertical front arm 26, an angled front arm 28, a front apex 29 defined by the connection of vertical front arm 26 and angled front arm 28, and a front wheel support flange 27 fixed therebetween. Front wheel support 24 is mounted upon the front portion of apex 14 of A-frame carriage 2 with the vertical front arm 26 rigidly attached to the top portion of front wall 18 of wheel receptacle 16 and angled front arm 28 rigidly attached to the outboard portion of apex 14 of A-frame carriage 2.

A rear wheel support 30 has a generally vertical rear arm 32, an angled rear arm 34, a rear apex 35 defined by the connection of vertical rear arm 32 and angled rear arm 34, and a rear wheel support flange 33 fixed therebetween. Rear wheel support 30 is mounted upon the rear portion of apex 14 of A-frame carriage 2 with the vertical rear arm 32 rigidly attached to the top portion of rear wall 20 of wheel receptacle 16 and angled rear arm 34 rigidly attached to the outboard portion of apex 14 of A-frame carriage 2.

Referring now to FIGS. 1 and 2, one of a pair of identical crushing pad points 38 is shown. Crushing pad point 38 comprises a top sleeve 40, a bottom sleeve 42, a left sleeve 41, a right sleeve 43, all rigidly joined to form a sleeve 47 having a rectangular cross-section. A face pad 44 is secured to the ends of sleeves 40, 42, 41 and 43 and extends beyond bottom sleeve 42. Top and bottom sleeves 40, 42 are essentially parallel and spaced-apart and attached perpendicularly to face pad 44. Left and right sleeves 41, 43 are essentially parallel and spaced-apart and attached perpendicularly to face pad 44. Sleeve support 46 is securely attached to the undersurface of bottom sleeve 42 and the extended end of face pad 44 thereby defining pad apex 45. In the specific embodiment illustrated, apex 45 is filled as shown.

In a specific embodiment designed for use with a metal compactor having a bed measuring about 48 inches by about 87 inches with crushing pad arms about 47 inches long and pivoted about 27 inches above the bed about 94 inches apart. The dimensions of bed plate 4 approximate as closely as possible the inside dimensions of the bed of a metal compactor. The angled formed by left and right frames 6, 8 of A-frame carriage 2 is about forty degrees, the distance of apex 14 above bed plate 4 is about twenty-eight inches, and the width dimensions of left and right frames 6, 8 are about twenty-four inches. The top edge portions of front wall 18, rear wall 20, and left wall 22 of wheel receptacle 16 are vertically displaced about thirty inches above bed plate 4, and the distance between front and rear walls 18, 20 is about eleven inches. The horizontal and vertical dimensions of front and rear walls 18, 20 are about thirteen inches and about twelve inches respectively, while the horizontal and vertical dimensions of left wall 22 are about twelve inches and about three inches respectively. The distance of front apex 29 of front wheel support 24 above bed plate 4 is about fifty one inches, and the distance of rear apex 35 of rear wheel support 30 above bed plate 4 is about thirty three inches. The inside cross-sectional horizontal and vertical dimensions of crushing pad points 38 are about thirty nine inches and about six inches respectively. The length of the extended end portion of face pad 44 beyond bottom sleeve 42 is about three inches. And, all of the parts illustrated and described above can be made of sheet metal and connected together by welding.

In operation, the wheel rim crusher of the invention is set upon the bed 62 of any metal compressor 64 having two oppositely disposed, hinged crushing pads 36. In the specific embodiment illustrated, crushing pads 36 are hinged to upright supports 66 located on opposite sides of bed 62 and moved by fluid actuated cylinder means 68, 70 and 72. (The support 66 and means 68, 70 and 72 not illustrated in FIG. 1 appear as the mirror-image of the support 66 and means 68, 70 and 72 illustrated). Bed plate 4 is superposed on the bed of the compressor. Front and rear lips 5, 7 prevent the wheel rim crusher from moving forward or rearward during operation, while the lateral extremeties of bed plate 4 prevent movement in lateral directions. Crushing pad points 38 are then positioned on crushing pads 36 and frictionally held in place. Wheel 56 is then placed in wheel receptacle 16 with wheel 56 resting upon apex 14 of A-frame carriage 2 and left wall 22 of wheel receptacle 16 as shown in FIG. 5. Wheel 56 is further supported in a generally vertical position by front wheel and rear wheel supports 24, 30. The metal compressor is then actuated to operate crushing pads 36 in a generally downward direction. As crushing pad points 38 move downward, they contact wheel 56 generally at about the ten o'clock and two o'clock positions along the periphery of wheel 56. Apex 14 engages the wheel 56 at about the six o'clock position. Force is applied by the crushing pads generally radially of wheel 56 crushing it into a shape approximating that depicted in FIG. 6. The aforementioned clock positions and generally radial direction will vary with the size of wheel 56 and the stage of the crushing operation. The opening in wheel receptacle 16 permits the lower left portion of wheel 56 to deform into the opening and both sides of the wheel to be fully crushed in the manner depicted in FIG. 6. At the completion of the crushing cycle, crushing pads 36 are raised, wheel 56 removed, and rim 60 readily removed and discarded therefrom.

The invention provides an improved wheel rim crusher. The crusher is adapted to be used with a scrap metal compactor having two oppositely disposed and hinged crushing pads. The wheel crusher of the invention eliminates waste of time and money heretofore spent in removing rims from wheels. The wheel crusher of the invention is simple in construction, simple to operate, simple to maintain, light in weight, yet durable and easily transportable and maneuverable.

While there have been described above the principles of this invention in connection with a specific device, it is to be clearly understood that this description is made only by way of example and not as a limitation to the scope of the invention.

What is claimed is:

1. An apparatus for crushing wheel rims to facilitate removing the rims from the wheels comprising a generally horizontally disposed bed plate for placement within a metal compactor having two oppositely disposed, hinged crushing pads and between said crushing pads,
   a wheel carriage having an upstanding crushing surface securely mounted upon said bed plate for supporting a wheel comprised of a tire and rim,
   said carriage having a front wheel support and a rear wheel support upstanding therefrom on opposite sides of said crushing surface supporting said wheel vertically, and
   two crushing pad points securely mounted on said pair of crushing pads,
   said metal compactor having means for operating said crushing pad points downward and into said wheel and rim generally radially thereof, whereby said rim is crushed between said crushing pad points and crushing surface.

2. The apparatus of claim 1 wherein said bed plate has front and rear lips depending generally perpendicularly therefrom.

3. The apparatus of claim 1 wherein said carriage has left and right frames securely joined together at the upper most edge portions thereof thereby forming said crushing surface.

4. The apparatus of claim 1 wherein said wheel carriage has a front wall and a rear wall securely attached to said carriage and extending to one side of said crushing surface, said front and rear walls being on opposite sides of said crushing surface, a side wall extending between said front and rear walls remote from said crushing surface, whereby a generally rectangular wheel receptacle is defined whereinto said rim at least partially moves upon crushing.

5. The apparatus of claim 1 wherein said front wheel support is upstanding from said crushing surface, said front wheel support has a generally vertical front arm with one end securely mounted upon said front wall of said wheel receptacle and an angled front arm with one end securely mounted outboard of said wheel receptacle upon said crushing surface, said front and angled arms securely joined together at the uppermost edge portions thereby forming a front apex, said front and angled arms further supported apart by a front wheel support flange.

6. The apparatus of claim 1 wherein said rear wheel support is upstanding from said crushing surface, said rear wheel support having a generally vertical rear arm with one end securely mounted upon said rear wall of said wheel receptacle and an angled rear arm with one end securely mounted outboard of said wheel receptacle upon said crushing surface, said front and angled rear arms securely joined together at the uppermost edge portions thereof thereby forming a rear apex, said vertical and angled rear arms further supported apart by a rear wheel support flange.

7. The apparatus of claim 1 wherein each of said crushing pad points have a bottom sleeve, a left sleeve and a right sleeve upstanding therefrom and securely attached thereto, a top sleeve securely attached to the remote upstanding end portions of said left and right sleeves thereby forming a generally rectangular sleeve structure adapted to receive therein the distal end of one of said crushing pads, a face pad generally perpendicularly disposed and securely attached to the end portions of said sleeves and extending below said bottom sleeve, a sleeve support securely attached to the undersurface of said bottom sleeve and to the extended edge portion of said face pad thereby forming a pad apex.

8. The apparatus of claim 1 further comprising means for positioning said carriage and said crushing surface relative to said crushing pads.

9. The apparatus of claim 1 wherein said crushing pad points and said crushing surface engage said wheel at about the 10 o'clock and 2 o'clock and 6 o'clock positions during the crushing operation.

10. The apparatus of claim 1 wherein said carriage has left and right frames securely joined together at the upper most edge portions thereof thereby forming said crushing surface, said wheel carriage has a front wall and a rear wall securely attached to said carriage and extending to one side of said crushing surface, said front and rear walls being on opposite sides of said crushing surface, a side wall extending between said front and rear walls remote from said crushing surface, whereby a generally rectangular wheel receptacle is defined where into said rim at least partially moves upon crushing, said front wheel support is upstanding from said crushing surface, said front wheel support has a generally vertical front arm with one end securely mounted upon said front wall of said wheel receptacle and an angled front arm with one end securely mounted outboard of said wheel receptacle upon said crushing surface, said front and angled arms securely joined together at the uppermost edge portions thereby forming a front apex, said front and angled arms further support apart by a front wheel support flange, said rear wheel support is upstanding from said crushing surface, said rear wheel support having a generally vertical rear arm with one end securely mounted upon said rear wall of said wheel receptacle and an angled rear arm with one end securely mounted outboard of said wheel receptacle upon said crushing surface, said front and angled rear arms securely joined together at the uppermost edge portions thereof thereby forming a rear apex, said vertical and angled rear arms further supported apart by a rear wheel support flange, each of said crushing pad points have a bottom sleeve, a left sleeve and a right sleeve upstanding therefrom and securely attached thereto, a top sleeve securely attached to the remote upstanding end portions of said left and right sleeves thereby forming a generally rectangular sleeve structure adopted to receive therein the distal end of one of said crushing pads, a face pad generally perpendicularly disposed and securely attached to the end portions of said sleeves and extending below said bottom sleeve, a sleeve support securely attached to the undersurface of said bottom sleeve and to the extended edge portion of said face pad thereby forming a pad apex.

11. An apparatus for crushing wheel rims to facilitate removing the rims from the wheels comprising a frame having a generally flat crushing bed and a pair of upright supports on opposite sides of said bed, a pair of arms connected to said upright supports, respectively, said arms being movable toward and away from said bed, a wheel carriage having an upstanding crushing surface securely mounted upon said bed for supporting a wheel comprised of a tire and rim, said carriage having a front wheel support and a rear wheel support upstanding therefrom on opposite sides of said crushing surface supporting said wheel vertically, and two crushing pad points securely mounted on said arms, and means for moving said arms whereby a wheel supported on said carriage can be crushed between said crushing pad points and said crushing surface.

* * * * *